(12) United States Patent
Farnum et al.

(10) Patent No.: US 10,884,863 B2
(45) Date of Patent: Jan. 5, 2021

(54) CLIENT SESSION RECLAIM FOR A DISTRIBUTED STORAGE SYSTEM

(71) Applicant: Red Hat, Inc., Raleigh, NC (US)

(72) Inventors: Gregory Allan Farnum, South Pasadena, CA (US); Jeffrey Thomas Layton, Wake Forest, NC (US); Patrick Joseph Donnelly, Mountain View, CA (US); Zheng Yan, Chengdu (CN)

(73) Assignee: Red Hat, Inc., Raleigh, NC (US)

( * ) Notice: Subject to any disclaimer, the term of this patent is extended or adjusted under 35 U.S.C. 154(b) by 167 days.

(21) Appl. No.: 16/040,667

(22) Filed: Jul. 20, 2018

(65) Prior Publication Data

US 2020/0026606 A1    Jan. 23, 2020

(51) Int. Cl.
    *G06F 11/00* (2006.01)
    *G06F 11/14* (2006.01)
    *H04L 29/08* (2006.01)

(52) U.S. Cl.
    CPC .......... *G06F 11/1438* (2013.01); *H04L 67/06* (2013.01); *H04L 67/1097* (2013.01); *G06F 2201/805* (2013.01)

(58) Field of Classification Search
    CPC ............. G06F 11/0727; G06F 11/3034; G06F 11/1438
See application file for complete search history.

(56) References Cited

U.S. PATENT DOCUMENTS

| 7,356,531 B1 | 4/2008 | Popelka et al. |
| 8,788,579 B2 | 7/2014 | Kruse et al. |
| 9,462,039 B2 | 10/2016 | George et al. |
| 2011/0202795 A1* | 8/2011 | Marathe .............. G06F 11/1438 714/23 |
| 2019/0042345 A1* | 2/2019 | Baptist ................ G06F 11/1471 |

FOREIGN PATENT DOCUMENTS

CN      101567805      10/2009

OTHER PUBLICATIONS

"New Reclaim-Related Operations for v4.1", Feb. 1, 2006, http://www.ietf.org/mail-archive/web/nfsv4/current/msg02552.html, 6 pages.

\* cited by examiner

*Primary Examiner* — Christopher S McCarthy
(74) *Attorney, Agent, or Firm* — Lowenstein Sandler LLP (57) ABSTRACT

The technology disclosed herein that may enable a client of a distributed storage system to recover a storage session after a failure occurs. An example method may include: identifying a storage session of a distributed storage service, the storage session comprising session data that corresponds to a storage object of the distributed storage service; providing, by a processing device of a client, an indication that the client is recovering the storage session; and obtaining, by the client, the session data of the storage session from one or more devices that accessed the storage object of the distributed storage service.

20 Claims, 7 Drawing Sheets

CLIENT SESSION RECLAIM FOR A DISTRIBUTED STORAGE SYSTEM

TECHNICAL FIELD

The present disclosure is generally related to a distributed storage system, and is more specifically related to recovering session data for a client of the distributed storage system.

BACKGROUND

Modern computers often store data in a distributed data store to enhance the access, redundancy, or capacity of data storage devices. The distributed data store may include multiple storage nodes that are used to store, organize, and provide access to data. The distributed data store may include servers that manage the data and clients that access the data. The clients may contribute to the distributed data store and access the data or may access the data without contributing to the distributed data store. The clients often share the ability to modify a common portion of the distributed data store. The server or client may avoid conflicting modifications by including data that controls which clients have access to which portions of the distributed data store.

BRIEF DESCRIPTION OF THE DRAWINGS

The present disclosure is illustrated by way of examples, and not by way of limitation, and may be more fully understood with references to the following detailed description when considered in connection with the figures, in which.

DETAILED DESCRIPTION

Distributed storage services often incorporate the features of distributed data stores and enable multiple clients to access and modify data using the distributed storage services. The distributed storage service may manage client access by establishing storage sessions. The storage session may exist between a client and the distributed storage service and may indicate which portions of the distributed storage service are being accessed by which clients. When clients fail, the clients typically lose the storage session and establish a new storage session when the clients are restarted. In the past, this was rarely a problem because a client failure would also affect the portions of the client that were using the storage session. It was believed that persisting a storage session for portions of the client that were also being restarted would provide little to no benefit. In modern computing environments, the clients of the distributed storage service often support other portions of the computing environment. For example, a client of the distributed storage service may function as a server for other devices and when the client fails it does not necessarily mean that the other portions of the computing environment that rely on the client are going to be restarted as was the case in less complex environments.

Aspects of the present disclosure address the above and other deficiencies by providing technology to enable a client of a distributed storage service to recover a storage session after a failure occurs. In one example, the technology disclosed herein may enable a client of a distributed storage service to detect the existence of a prior storage session. The prior storage session may have included session data that was lost because of the failure and had corresponded to one or more storage objects of the distributed storage service. The client may recover (e.g., reclaim) the storage session by providing an indication to the distributed storage service and obtaining the session data of the storage session from one or more devices. The one or more client devices may have previously accessed or attempted to access the storage object of the distributed storage service. In one example, the client of the distributed storage service may function as a server that exports the storage objects to the one or more devices. The devices may rely on the client of the distributed storage service because the devices may not be configured or authorized to interact with the distributed storage service directly.

The systems and methods described herein include technology that enhances the field of distributed data storage and recovery. In particular, aspects of the present disclosure may enhance fault tolerance and failure recovery of a distributed data storage system. This may be accomplished by enabling a client of a distributed storage service to recover an existing storage session and reduce the overhead associated with creating a new replacement storage session. The reduction in overhead may benefit the client and may also benefit downstream devices that rely on the client to access content of the distributed storage service. In one example, the technology is beneficial because it may enable a failing client to recover more quickly from a failure (e.g., hard reset or other interruption). In another example, the technology is beneficial because it may enable another client (e.g., standby client or peer) to more quickly replace the failed client. Aspects of the present disclosure may also enable the client to recover session data from downstream devices as an alternative to or in addition to recovering the session data from a peer client or from an upstream device (e.g., server) of the distributed storage service. The downstream devices may carry a lower computing load and therefore the recovery may occur in a more load balanced and distributed manner. The computing load on a downstream device may be lower because access to data storage may be arranged in a star configuration and the computing load on devices upstream (e.g., closer to the data store) may be higher than the computing load on peer devises or client devices that are downstream (e.g., farther away from the data store).

Various aspects of the above referenced methods and systems are described in details herein below by way of examples, rather than by way of limitation. The examples provided below discuss a computing environment where the devices are executed using virtualization technology (e.g., virtual machines or containers), but other examples may include devices that are executed on physical machines that are absent the virtualization technology discussed below (e.g., absent hardware level virtualization or operating system level virtualization).

Figure 1:
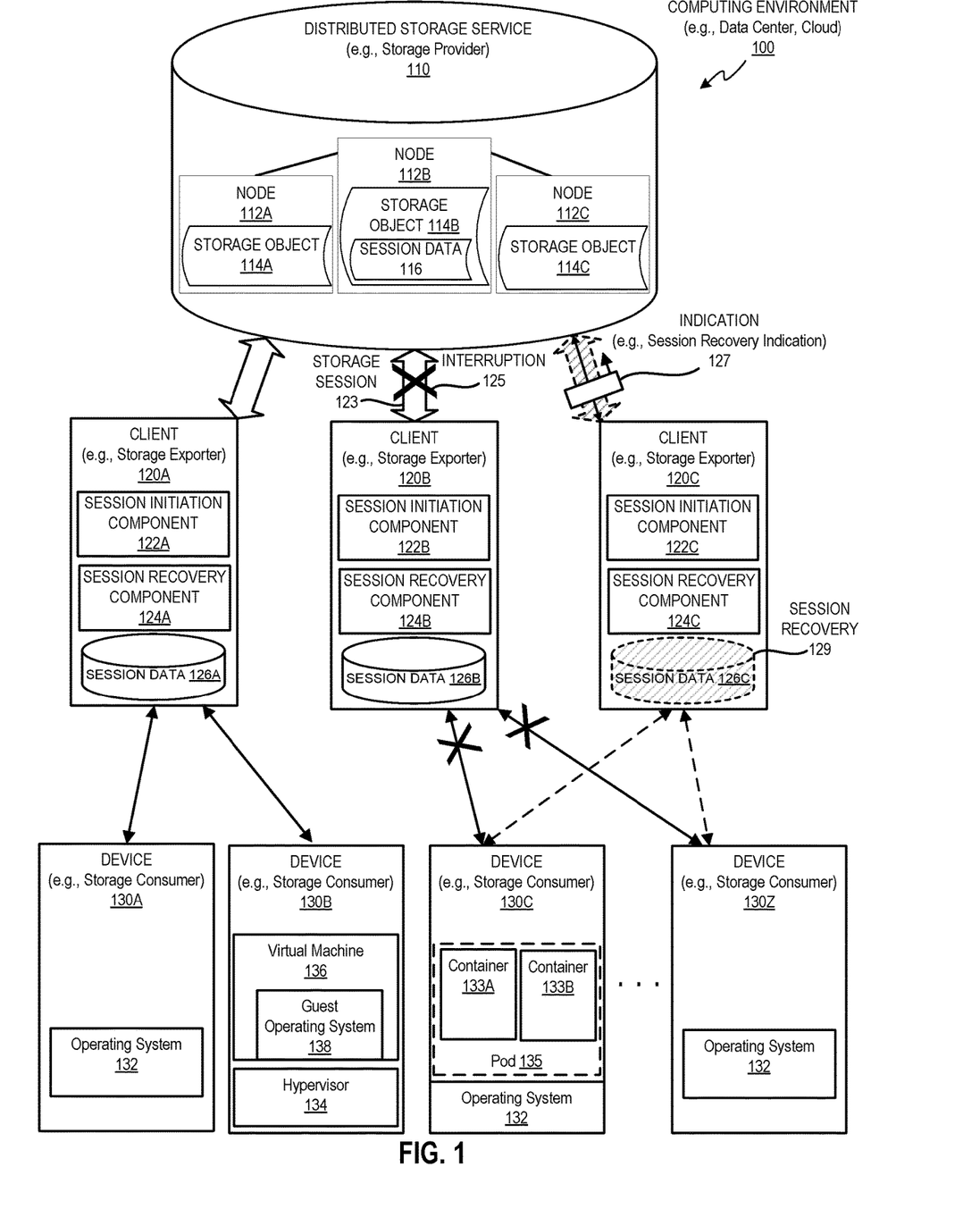
FIG. 1 depicts a high-level block diagram of an example computing environment, in accordance with one or more aspects of the present disclosure.

FIG. 1 illustrates an exemplary computing environment 100 in which implementations of the disclosure may operate. Computing environment 100 may include multiple computing devices associated with one or more cloud environments, data centers, data rooms, other arrangement of devices, or a combination thereof. In one example, computing environment 100 may include a distributed storage service 110 (e.g., storage provider), one or more clients 120A-C (e.g., storage exporters), and one or more devices 130A-Z (e.g., storage consumers).

Distributed storage service 110 may store and manage the distribution of data across multiple nodes 112A-C. Distributed storage service 110 may function as a block-based storage service, file-based storage service, a record based storage service, or a combination thereof. A block-based storage service may provide access to data at a block level and may appear similar to block level storage device (e.g., Storage Area Network (SAN) devices). A file-based storage service may provide access to data at a file level and may appear similar to file level storage device (e.g., Network Attached Storage (NAS) devices). In one example, distributed storage service 110 may be the same or similar to Ceph (e.g., CephFS), Andrew File System (AFS), Gluster (e.g., GlusterFS), Hadoop® Distributed File System (HDFS), Google® File System (GFS), Oracle® Automatic Storage Management (e.g., ASM or CloudFS), other data storage system, or a combination thereof that is capable of storing object data (e.g. file data, session data, or other content) on one or more nodes 112A-C.

Nodes 112A-C may store object data and manage the storage functions of distributed storage service 110. Each of the nodes 112A-C may contribute to data storage resources, data processing resources or a combination thereof. In one example, all of the nodes may provide data storage resources and data processing resources for distributed storage service 110. In another example, one or more of the nodes may provide data processing resources to manage other nodes without providing data storage resources to store storage objects for distributed storage service 110. Each of the nodes may be separate computing device or share one or more computing devices. The computing devices may client devices (e.g., desktops, laptops, and tablets), server devices (e.g., servers of a cluster), data storage devices (e.g., Network Attached Storage (NAS) or Storage Area Network (SAN)), other computing devices, or a combination thereof. Together the nodes may function to create, store, and modify storage objects 114A-C.

Storage objects 114A-C may be one or more blocks, files, records, other data structures, or a combination thereof. Each storage object 114A-C may be stored by one or more of the nodes 112A-C and may correspond to a data structure that organizes data and identifies portions (e.g., locations) within a storage space. Each of the storage objects 114A-C may correspond to object metadata and object content. The object metadata may include identification data, permission data, ownership data, access data, creation data, other data, or a combination thereof. A storage object may be include file objects (e.g., files, directories) and may include file metadata such as one or more attributes or extended attributes such as identifiers (e.g., GUID, UUID), names (e.g., file name, directory name), permissions (e.g., read, write execute), type (e.g., file type), ownership, creation time, other attributes, or a combination thereof. In one example, one or more of the storage objects of distributed storage service 110 may include session data 116. Session data 116 may correspond with session data 128C and may be used to assist a client recover some or all of session data 126C after an interruption occurs. The storage objects 114A-C may be accessed by one or more clients 120A-C.

Clients 120A-C may include computing devices that function as clients of the distributed storage service 110. Each client may comprise one or more computing devices with one or more processors communicatively coupled to memory devices and input/output (I/O) devices, as described in more details herein below with references to FIG. 7. Clients 120A-C may be external to the distributed storage service 110, as shown in FIG. 1, or may be internal to distributed storage service 110 (not shown). For example, client 120A may function as a storage node and as a client of the distributed storage service 110. Each of clients 120A-C may communicate with one or more nodes 112A-C to add, remove, access, or modify storage objects 114A-C. Clients 120A-C may connect with nodes 112A-C over an indirect connection or a direct connection. An indirect connection with a node may include a combination of one or more communication channels that pass through an intermediate node. For example, an indirect connection between client 120A and node 112B may involve a first communication channel between client 120A and node 112A and a second communication channel between node 112A and node 112B. A direct connection may be connection in which client 120A has a communication channel between itself and a node (e.g., 112A) without traversing an intermediate node.

Clients 120A-C may export portions of distributed storage service 110 to one or more devices 130A-Z. When this occurs, a computing device functioning as a client of distributed storage service 110 also function as a server (e.g., storage export server) for the one or more devices 130A-Z. Each of the clients 120A-C may support one or more data transfer protocols to access the storage objects and to export storage objects. For example, a first protocol may enable the client to access content of distributed storage service 110 and a second protocol may enable the client to export the content to devices 130A-Z. In one example, the second protocol may be a part of an object access service that exports the storage objects of the distributed storage service 110 over a network (e.g., intranet, internet). The object access service may run at any level of privilege, such as running as part of a kernel (e.g., kernel mode supervisor, master, privileged mode) or as part of a user space (e.g., application space, user mode). Object access service may be packaged with an operating system or may be added or installed to an existing operating system. Examples of the object access service may include a file access service, block access service, or a combination thereof. The file access service may be the same or similar to a Network File System (NFS), Common Interconnected File System (CIFS), Server Message Block (SMB), Apple Filing Protocol (AFP), NetWare Core Protocol (NCP), other file sharing technology, or a combination thereof.

In the example, shown in FIG. 1, clients 120A-Z may include session initiation components 122A-C and session recovery components 124A-C. Session initiation components 122A-C may enable clients 120A-C to establish respective storage sessions 123 with distributed storage service 110. Storage session 123 may be an interactive information interchange between a client and one or more nodes of the distributed storage service 110. Each of the clients 120A-C may establish a storage session and may store session data 126A-C. Session data 126A-C may indicate the storage objects associated with each of the storage sessions and may include session identification data, object identification data, lock data, object handle data, permission data, device data, other data, or a combination thereof. Session data 126A-C may be stored in persistent data storage, non-persistent storage, or a combination thereof. In one example, a session identifier may be stored in persistent storage and the remaining session data may be stored in non-persistent storage. When an interruption 125 occurs, the session data within non-persistent storage may be lost.

Interruption 125 may be an event that occurs internal or external to computing environment 100 and adversely affects the ability of client 120B to provide devices 130C-Z with access to storage objects. As discussed above, client 120B may function as a client of the distributed storage service 110 and also as a server providing devices 130A-Z with access to content of the distributed storage service 110. Interruption 125 may be any event that interferes with the ability of client 120B to perform one or more of these functions. Interruption 125 may be the result of one or more failures such as system failures (e.g., power loss, operating system failure, application failure), transmission failures (e.g., networking failure), other failure, or combination thereof.

Session recovery component 124A-C may enable a client (e.g., 120B) to perform session recovery 129 to recreate session data for the storage session that was interrupted. In one example, client 120B may fail (e.g., crash) and a portion of session data 126B may be lost because it is stored in non-persistent storage. Client 120B may then restart (e.g., restart NFS service or reboot device) and recover session data 126B. In another example (shown in FIG. 1), client 120B may be affected by interruption 125 and another client 120C (e.g., peer device) may recover the session data. In either example, session recovery component 124A-C may enable the respective client to provide an indication 127 (e.g., session recovery indication) to distributed storage service 110 to reclaim the session and recover lost session data. Distributed storage service 110 may function as the primary authority for managing the session recovery 129 and the lost session data may be recovered from session data stored within distributed storage service 110, from one or more devices 130A-Z, or from a combination thereof.

Devices 130A-Z may be computing devices that access data exported by the storage exporting features of clients 120A-C. Devices 130A-Z may each include a client portion of the object access service and may function as a client of one or more of the clients 120A-C. The client portion of the object access service may execute at any level of privilege such as running as part of a kernel or in a kernel mode (e.g., supervisor, master, privileged mode) or as part of a user space in user mode. Object access service may be packaged with an operating system or may be added or installed to an existing operating system. In one example, object access service may include a mount process (e.g., daemon, service) that runs on devices 130A-Z and may support an operating systems native API. The native API may be any standardized or proprietary operating system API, such as the Portable Operating System Interview (POSIX) API or the Microsoft Windows® API.

Devices 130A-Z may be physical devices (e.g., physical machines), virtual devices (e.g., virtual machines, containers), or a combination thereof. The below description of devices 130A-Z may also apply to clients 120A-C, and nodes 112A-C and one of the devices 130A-Z may function as a node, a client, or a combination thereof. One or more of the devices (e.g., 130A and 130Z) may be absent virtualization technology and one or more of the devices (e.g., 130B and 130C) may provide one or more levels of virtualization. The levels of virtualization may include hardware level virtualization, operating system level virtualization, other virtualization, or a combination thereof. The hardware level virtualization may involve a hypervisor (e.g., virtual machine monitor) that emulates portions of a physical system and manages one or more virtual machines. In contrast, operating system level virtualization may include a single operating system kernel that manages multiple isolated virtual containers. Each virtual container may share the kernel of the underlying operating system without requiring its own kernel.

Device 130B may provide hardware level virtualization by running a hypervisor 134 that provides hardware resources to one or more virtual machines 136. Hypervisor 134 may be any program or combination of programs and may run directly on the hardware (e.g., bare-metal hypervisor) or may run on or within a host operating system (not shown). Hypervisor 134 may manage and monitor various aspects of the operations of the computing device, including the storage, memory, and network interfaces. The hypervisor may abstract the physical layer features such as processors, memory, and I/O devices, and present this abstraction as virtual devices to a virtual machine 136 executing a guest operating system 138.

Guest operating system 138 may be any program or combination of programs that are capable of managing computing resources of virtual machine 136 and/or device 130B. Guest operating system 138 may include a kernel comprising one or more kernel space programs (e.g., memory driver, network driver, file system driver) for interacting with virtual hardware devices or actual hardware devices. In one example, guest operating system 138 may include Linux®, Solaris®, Microsoft Windows®, Apple Mac®, other operating system, or a combination thereof.

Device 130C may be similar to device 130B and may provide operating system level virtualization by running a computer program that provides computing resources to one or more containers 133A-B. Operating system level virtualization may be implemented within the kernel of operating system 132 and may enable the existence of multiple isolated containers. In one example, operating system level virtualization may not require hardware support and may impose little to no overhead because programs within each of the containers may use the system calls of the same underlying operating system 132. This may enable device 130C to provide virtualization without the need to provide hardware emulation or be run in an intermediate virtual machine as may occur with hardware level virtualization. Operating system level virtualization may provide resource management features that isolate or limit the impact of one container (e.g., container 133A) on the resources of another container (e.g., container 133B).

The operating system level virtualization may provide a pool of computing resources that are accessible by container 133A and are isolated from one or more other containers (e.g., container 133B). The pool of resources may include file system resources (e.g., particular file system state), network resources (e.g., particular network interfaces, sockets, addresses, or ports), memory resources (e.g., particular memory portions), other computing resources, or a combination thereof. The operating system level virtualization may also limit (e.g., isolate) a container's access to one or more computing resources by monitoring the containers activity and restricting the activity in view of one or more limits. The limits may restrict the rate of the activity, the aggregate amount of the activity, or a combination thereof. The limits may include one or more of file system limits, disk limits, input/out (I/O) limits, memory limits, CPU limits, network limits, other limits, or a combination thereof.

Operating system 132 may include an operating system virtualizer that may provide containers 133A-B with access to computing resources. The operating system virtualizer may wrap one or more processes (e.g., of a particular service) in a complete file system that contains the code, runtime, system tools, system libraries, and other data present on the device (e.g., a particular file system state) that can be used by the processes executing within the container. In one example, the operating system virtualizer may be the same or similar to Docker® for Linux® or Windows®, ThinApp® by VMWare®, Solaris Zones® by Oracle®, other program, or a combination thereof that automates the packaging, deployment, and execution of applications inside containers.

Each of the containers 133A-B may refer to a resource-constrained process space of device 130C that can execute functionality of a program. Containers 133A-B may be referred to as a user-space instances, a virtualization engines (VE), or jails and may appear to a user as a standalone instance of the user space of operating system 132. Each of the containers 133A-B may share the same kernel but may be constrained to use only a defined set of computing resources (e.g., CPU, memory, I/O). Aspects of the disclosure can create one or more containers to host a framework or provide other functionality of a service (e.g., web application functionality, database functionality) and may therefore be referred to as "service containers" or "application containers."

Pod 135 may be a data structure that is used to organize one or more containers 133A-B and enhance sharing between the containers, which may reduce the level of isolation between containers within the same pod. Each pod may include one or more containers that share some computing resources with another container associated with the pod. Each pod may be associated with a unique identifier, which may be a networking address (e.g., IP address), that allows applications to use ports without a risk of conflict. A pod may be associated with a pool of resources and may define a volume, such as a local disk directory or a network disk and may expose the volume to one or more (e.g., all) of the containers within the pod. In one example, all of the containers associated with a particular pod may be co-located on the same device 130C. In another example, the containers associated with a particular pod may be located on different devices that are on the same or different physical machines.

Computing environment 100 may include one or more networks. The one or more networks may include a public network (e.g., the internet), a private network (e.g., a local area network (LAN) or wide area network (WAN)), or a combination thereof. In one example, the network may include a wired or a wireless infrastructure, which may be provided by one or more wireless communications systems, such as a wireless fidelity (WiFi) hotspot connected with the network and/or a wireless carrier system that can be implemented using various data processing equipment, communication towers, etc.

Figure 2:
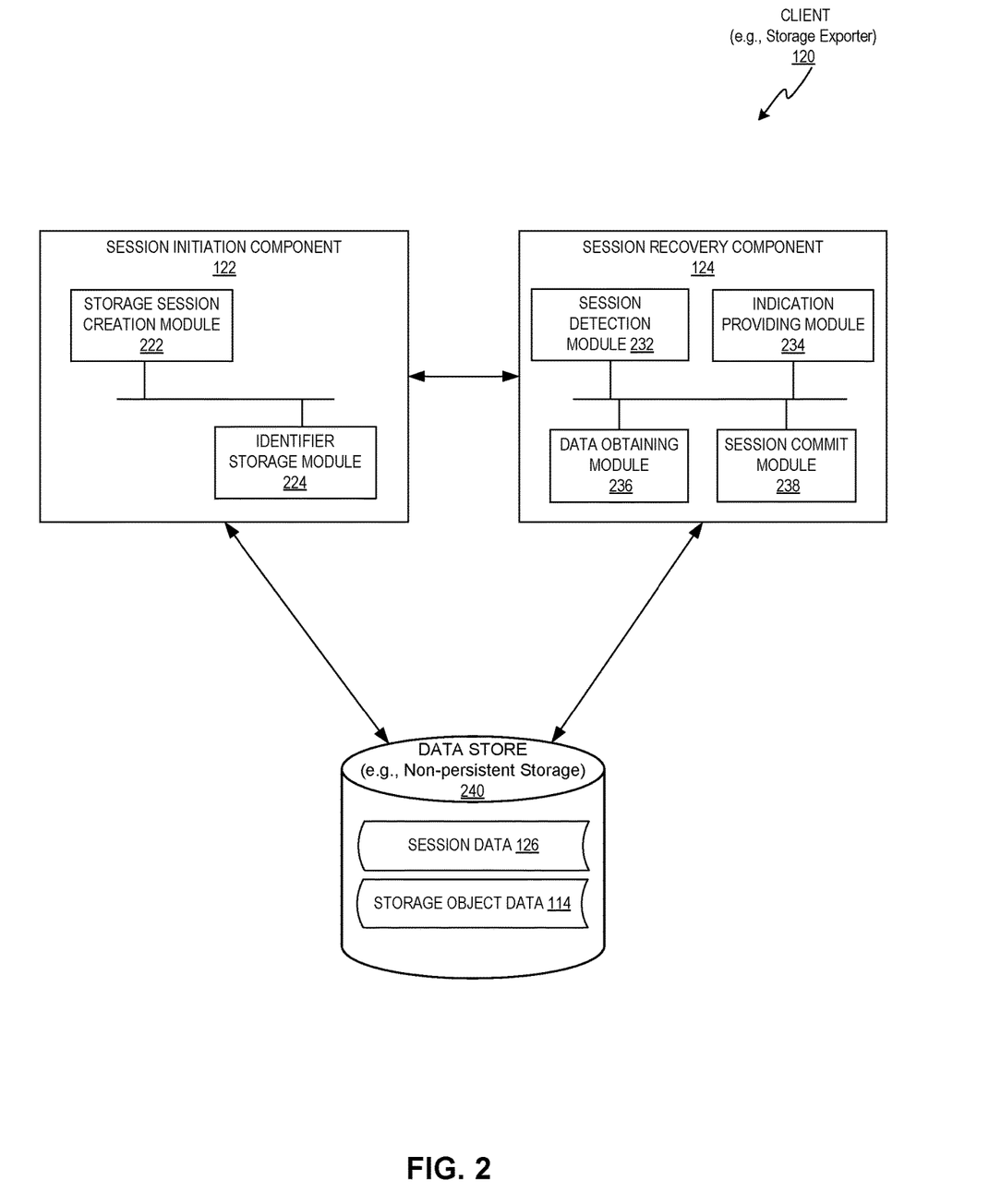
FIG. 2 depicts a block diagram of an example client with one or more components and modules, in accordance with one or more aspects of the present disclosure.

FIG. 2 is a block diagram illustrating example components and modules of client 120, in accordance with one or more aspects of the present disclosure. Client 120 may be the same or similar to one or more of the clients 120A-C of FIG. 1. The components, modules, or features discussed in regards to client 120 may be consolidated to a single computing device or may be spread across multiple computing devices (e.g., a cluster). In the example shown in FIG. 2, client 120 may include a session initiation component 122, a session recovery component 124, and a data store 240.

Session initiation component 122 may enable client 120 to establish a storage session with a distributed storage service. The distributed storage service may store data across one or more nodes and provide client 120 with access to the data at a bit level, byte level, block level, file level, record level, other storage object granularity, or a combination thereof. The distributed storage service may include multiple nodes and one or more of the nodes may store data for a particular storage object. For example, a single storage object may be stored on or across multiple nodes using a data storage technique such as data striping, data mirroring, data parity, other storage technique, or a combination thereof. Some of the nodes may be management nodes that may or may not contain data of any storage object. Client 120 may interact with a management node of the distributed storage to access the storage objects. In one example, session initiation component 122 may include a storage session creation module 222 and an identifier storage module 224.

Storage session creation module 222 may enable client 120 to initiate the creation of a storage session with the distributed storage service. The storage session may be an interactive information interchange that occurs over one or more network connections between client 120 and one or more nodes of the distributed storage service. A storage session may be established for each client and may enable the distributed storage service and/or client to identify which clients or devices are accessing which storage objects. Multiple devices may access the same storage object and the storage sessions may assist in managing access to the storage object to handle attempts to simultaneously access or update storage objects. Each storage session may be associated with session data that indicates information about the distributed storage service, client, or device and may be stored by the client of the distributed storage service (e.g., client 120), the server of the distributed storage service (e.g., a node), other entity, or a combination thereof. As shown in FIG. 1, client 120 may store data for a storage session in data store 240 as session data 126.

Session data 126 may indicate the storage objects associated with the storage session and may be the same or similar to session data 126A-C of FIG. 1. Session data 126 may be a data structure that indicates some or all of the storage objects that are associated with the storage session and may include information about the one or more processes, users, devices, or a combination thereof that are associated with the storage objects. In one example, session data 126 may include object identification data, permission data, lock data, open object data, user data, device data, other data, or a combination thereof. The object identification data may include a data structure (e.g., an identifier or pointer) that uniquely identifies a storage object within the distributed storage system. The object identification data may include numeric data, non-numeric data, or a combination thereof and may provide one or more location addressable identifiers (e.g., object name or storage location) or content addressable identifiers (e.g., hash of object content). The permission data may indicate the permissions associated with a storage object and may indicate whether the client can access or modify a storage object. The lock data may include data associated with a locking data structure that represents a locking state of a storage object (e.g., locked, unlocked, waiting). The open object data may include data associated with a set of opened storage objects (e.g., opened files) and may include data of one or more handle data structures (e.g., file handles) that represent an object that is able to be accessed (e.g., readable, writable, executable). The lock data and open object data may enable the client or the distributed storage service to coordinate access or modifications of a storage object across multiple clients. The user data and device data may be associated with an account (e.g., user account and/or device account) and may indicate information about a device providing, exporting, or consuming the storage object.

Identifier storage module 224 may enable client 120 to determine an identifier of the storage session and to store the identifier in persistent storage. The identifier may be generated before, during, or after the session is established and may be generated by a client of the distributed storage service, by a server of the distributed storage service, or a combination thereof. In one example, client 120 may generate the session identifier and may transmit the session identifier to a node of the distributed storage service. In another example, a node of the distributed storage service 110 may generate the session identifier and transmit the session identifier to the client of the distributed storage service. In either example, identifier storage module 224 may cause the session identifier to be stored in a non-persistent storage, persistent storage, or a combination thereof. The storage may be at a location that is local to the computing device executing client 120 (e.g., integrated storage or attached storage) or may be remote from the computing device executing client 120 (e.g., within the distributed storage service. Storing the identifier in persistent storage may be advantageous because some or all of the session data may become inaccessible due to an interruption (e.g., client failure). The identifier may enable the session to be recovered by a session recovery component 124 executing on the same client that encountered the interruption or by a session recovery component executing on a different client (e.g., peer) on another node or system.

Session recovery component 124 may enable client 120 to recover a prior storage session between a client and the distributed storage service. The prior storage session may have existed between client 120 and the distributed storage service or between another client (e.g., peer) and the distributed storage service. In one example, the storage session may be associated with a client before an interruption and may be associated with a different client after the interruption. The different client may be a peer device in a homogenous or heterogeneous group (e.g., computing cluster or grid). In another example, the storage session may be associated with the same client before and after the interruption. The same client may be the same instance of the client and may occur when the client was restarted (e.g., executable service restarted or machine restarted) or a different instance of the same client (e.g., different instance of the same virtual machine or container). Recovering a prior storage session may be the same or similar to claiming, reclaiming, acquiring, reacquiring, repossessing, other operation, or a combination thereof. In the example shown in FIG. 2, session recovery component 124 may include a session detection module 232, an indication providing module 234, a data obtaining module 236, and a session commit module 238.

Session detection module 232 may enable client 120 to detect the existence of prior sessions and to detect an identifier of one or more of the prior sessions. Session detection module 232 may detect the existence of the prior session by checking for an identifier at a predetermined location. The predetermined location may be associated with a particular directory (e.g., session directory), file (e.g., session file), line (e.g., session entry), field (e.g., session field), record (e.g., registry key), row, other data structure, or a combination thereof. The predetermined location may be local to client 120 or remote from client 120 and may be a location accessible to and shared by one or more clients of a group (e.g., cluster). Once session detection module 232 has detected the existence of a prior session, it may determine the identifier of the prior session using a single operation (e.g., read operation) or one or more operations (e.g., list directory and read file). In one example, the success of a read operation may indicate a prior session exists and the data returned by the read operation may indicate the identifier of the session. In response to detecting the prior session, session detection module 232 may initiate a grace period to extend a time out period.

There may be one or more time outs associated with a session. A first time out may corresponds to a stale session where a client known to the distributed storage service holding the session has not communicated with the distributed storage service or where another client has not initiated reclaim on the stale session. After this time out is exceeded the session data may be released. A second time out may correspond to a duration in which a client can recover a session. The second time out may extend the first time out after a recovery is initiated (e.g., grace period). A third time out may correspond to storage consumers (e.g., NFS clients) and may be a duration in which the storage consumers can initiate a reclaim request with the clients (e.g., client 120).

A grace period may extend any time out period associated with an aspect of the storage session and may provide additional time for client 120 to recover the prior storage session. The distributed storage service may manage the enforcement of the grace period across one or more clients. During the grace period (e.g., time out) the distributed storage service may avoid providing conflicting session data to clients to enable one of the clients to recover session data even if the session data has not been refreshed prior to its time out period (e.g., stale session data).

The grace period may extend a time out period associated with a storage object lock, storage session, connection, user, device, other aspect, or a combination thereof. In one example, the time out period may be the same or similar to a lease period of a lock on a storage object. In another example, the time out period may be the same or similar to a lease period of a storage session. The lease period may be the duration of time the corresponding lease can be held without being refreshed. When the duration is exceeded, the lease may be released (e.g., lock released), evicted (e.g., session evicted), replaced, stale, other operation, or a combination thereof. The default time out period may be a predetermined duration (e.g., 9, 90, or other quantity of seconds) and the grace period may extend the time out period to a longer duration (e.g., 120, 1200, or other quantity of seconds). The duration of the grace period may be further extended one or more times (e.g., add an additional 2 minutes) and may be based on a predetermined duration that can be configured or modified by a system administrator, designer, developer, or a combination thereof.

The duration of the grace period may depend on factors present in the computing environment. The factors may relate to a server of the distributed storage service (e.g., node), a client of the distributed storage service, a device relying on the client, other entity, or a combination thereof. For example, if the client and the server of the distributed storage service lose the session data (e.g., both restarted) the grace period may be set to a duration that is longer than if the session data were lost from the client but remained on the server. The longer duration may refer to as a "group wide" grace period and may affect all remaining clients in a group (e.g., cluster or grid of NFS servers). The shorter duration may be for an "individual" grace period and may affect only one client in the group (e.g., the client recovering the session).

Indication providing module 234 may enable client 120 to provide an indication to the distributed storage service that indicates client 120 is attempting to recover a prior session. The indication may involve transmitting a message using one or more Remote Procedure Calls (RPCs), shared storage modifications (e.g., setting flags), other form of inter-process communication, or a combination thereof. The indication may include information that enables the distributed storage service to identify the prior session and may or may not include the identifier of the prior session. In one example, the indication may be a session recovery request that seeks authorization to recover the prior session and client 120 may delay or avoid proceeding until the distributed storage service responds. In another example, the indication may inform the distributed storage service that client 120 intends to recover the prior session and client 120 may proceed with the recovery without delaying or seeking authorization. In either example, the indication may signal that an attempt at a session recovery has begun and may enable the client or distributed storage service to avoid having multiple clients recover the same prior session. The indication may also be advantageous because it may cause the distributed storage service to initiate a grace period and delay or avoid evicting the storage session, releasing locks, flushing storage data, other action, or a combination thereof.

Data obtaining module 236 may enable client 120 to obtain data to recover the lost session data of the prior storage session. Data obtaining module 236 may obtain data from downstream devices (e.g., devices 130A-Z), peer devices (e.g., clients 120A-C), upstream devices (e.g., nodes 112A-C), other devices, or a combination thereof. In one example, data obtaining module 236 may obtain data to recover the session data of the prior session from only downstream devices. In another example, data obtaining module 236 may recover some or all of session data 126 from a peer or an upstream device (e.g., server node of the distributed storage service). Obtaining the data from downstream device may be advantageous because there may be less computing load on the downstream devices when compared to the computing load on the upstream devices.

Obtaining the session data of the prior storage session may involve receiving reclaim requests from the downstream devices. As discussed above, the client of the distributed storage service may be exporting storage objects stored within the distributed storage service to one or more other devices. The one or more other devices may therefore be clients of the distributed storage client (e.g., clients of clients) and may be referred to as storage consumers as opposed to storage providers and storage exporters. The downstream devices may include object access clients (e.g., NFS clients) that interact with an object access server (e.g., NFS server) executing on client 120.

When an object access client detects an interruption affecting access to the exported storage objects it may initiate reclaim requests. The reclaim requests may identify a storage object that had an open handle or prior lock and may attempt to reclaim these. A reclaim request may be different from a new request that is attempting to acquire access that was not previously associated with the storage session. The object access server may receive reclaim requests and new requests from multiple devices but may ignore any and all new requests during a grace period to provide time for the features of the prior storage session to be reclaimed. A reclaim request may include storage object identification data, user data, device data, other data, or a combination thereof.

Data obtaining module 236 may receive and analyze the reclaim requests and compare data to existing data available on client 120. For example, the reclaim requests may indicate the originating device and the data obtaining module 236 may compare the originating device (e.g., client ID) to a set of devices stored in persistent storage (e.g., list of prior NFS clients). If the device was included in the set, data obtaining module may derive (e.g., generate, recover, rebuild) the session data in view of the data from the reclaim request. This may involve adding the storage object indicated by the reclaim request and information about the handle or lock to session data 126. Data obtaining module 236 may then transmit content of the reclaim request to the distributed storage service 110 so that the distributed storage service holds the lock or handle for the storage object.

Session commit module 238 may enable the client 120 to indicate to the distributed storage service that it has recovered the prior storage session. Session commit module 238 may determine that the session has been recovered by using a historical device set, a timer, or a combination thereof. When using the historical device set (e.g., NFS client list), the session commit module 238 may track which devices have transmitted reclaim requests and may compare the devices to the devices in the historical device set. In one example, session commit module 238 may determine that client 120 has received reclaim requests from all of the corresponding devices in the historical device set. In another example, session commit module 238 may determine that client 120 is missing reclaim requests from one or more of the devices on the historical device set. In this later example, session commit module 238 may wait for a predetermined duration of time (e.g., until end of grace period) and if no reclaim request is received it may conclude the device is no longer involved with the prior storage session. In either example, session commit module 238 may transmit another indication to indicate to the distributed storage service that client 120 has completed the recovery of the storage session. The distributed storage service may then update its local copy of the session data to reflect the session data that remains in use. For example, if may remove (e.g., flush) a portion of the session data related to a device that is no longer involved with the storage session.

Figure 3:
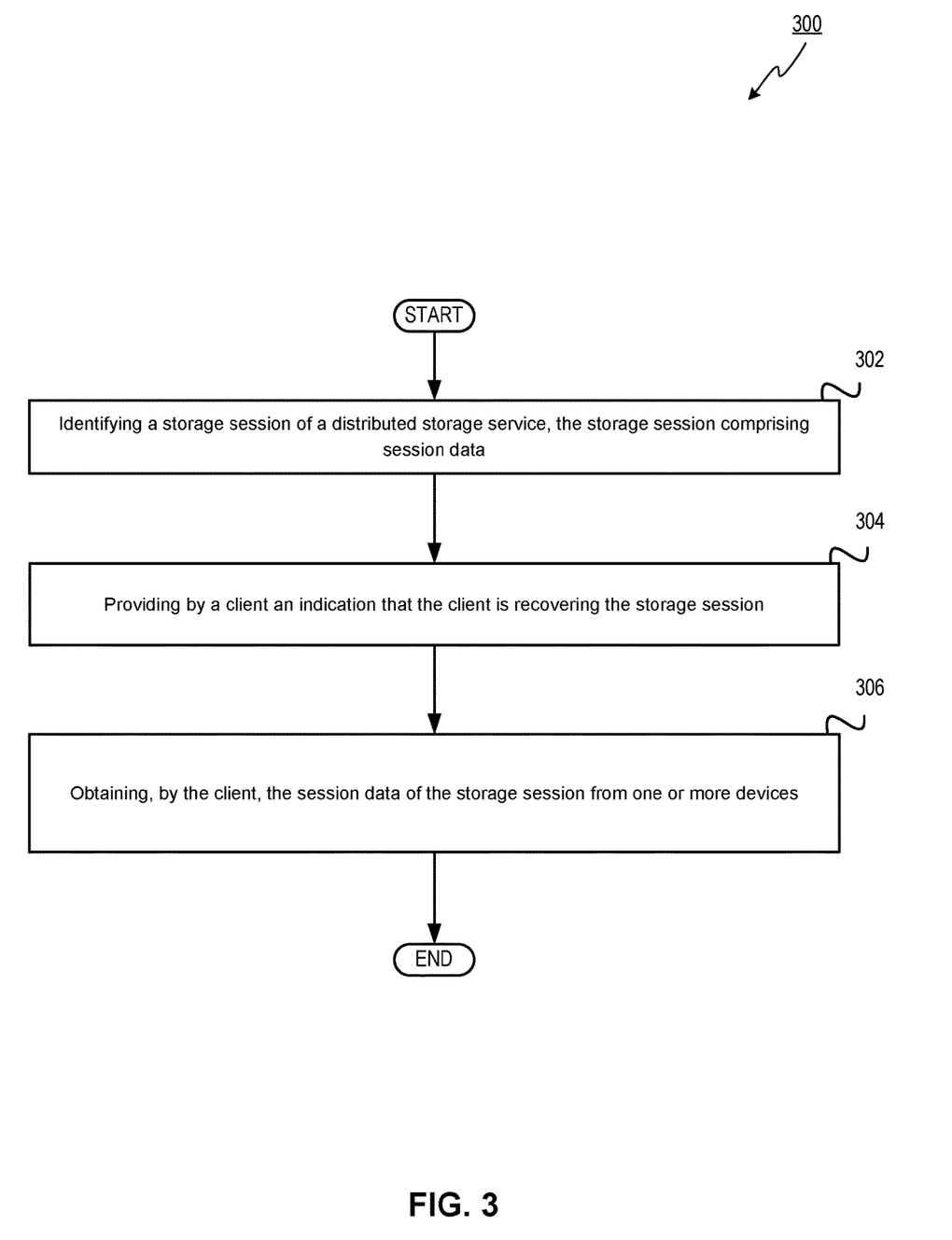
FIG. 3 depicts a flow diagram of an example method for recovering a storage session for a client of a distributed storage service, in accordance with one or more aspects of the present disclosure.

FIG. 3 depicts a flow diagram of one illustrative example of a method 300 for recovering a storage session for a distributed storage service, in accordance with one or more aspects of the present disclosure. Method 300 and each of its individual functions, routines, subroutines, or operations may be performed by one or more processors of the computer device executing the method. In certain implementations, method 300 may be performed by a single computing device. Alternatively, method 300 may be performed by two or more computing devices, each computing device executing one or more individual functions, routines, subroutines, or operations of the method.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media. In one implementation, method 300 may be performed by components 122 and 124 as shown in FIG. 2.

Method 300 may be performed by processing devices of a client device or server device and may begin at block 302. At block 302, a processing device may identify a storage session of a distributed storage service. The storage session may include session data that corresponds to a storage object of the distributed storage service. The session data may include lock data, permission data, object identification data, other data, or a combination thereof and be associated with one or more storage objects of the distributed storage service. The distributed storage service may include a plurality of nodes that each include data of the storage object and the distributed storage service may provide block level access or file level access to the storage object. In one example, the processing device may initiate a creation of the storage session with a storage provider of the distributed storage service and store an identifier of the storage session in persistent data storage. After the storage session is interrupted (e.g., client crashes), the processing device may identify the storage session by detecting the identifier in the persistent data storage of the client after the client is restarted.

At block 304, the processing device of a client may provide an indication that the client is recovering the storage session. Providing the indication may involve the client transmitting a signal or message to the distributed storage service to claim (e.g., acquire, recover, reclaim) the prior storage session. The message or signal may include a request to reclaim the storage session and may elicit a response indicating the storage session exists (e.g., not been evicted). The message may include an identifier of the storage session (e.g., pre-existing storage session) and the identifier may have been generated by the client of the distributed storage service or by a node of the distributed storage service. The indication may be provided in response to determining that access to the distributed storage service was interrupted and the indication may be provided before, during, or after initiating a grace period for recovering the storage session. In one example, the storage session may be associated with a first client before an interruption and may be associated with a second client after the interruption. In another example, the storage session may be associated with a first client before an interruption and may be associated with the first client after the interruption.

At block 306, the processing device of the client may obtain the session data of the storage session from one or more devices that accessed the storage object of the distributed storage service. Obtaining session data of the storage session from the one or more devices may involve deriving (e.g., acquiring, gathering, rebuilding) the session data from reclaim requests received from the one or more devices. The client of the distributed storage service may export the storage object of the distributed storage service to the one or more devices. In one example, the one or more devices may include a plurality of Network File System (NFS) clients and the client may include an NFS server providing the one or more devices with access to the storage object of the distributed storage service. Responsive to completing the operations described herein above with references to block 306, the method may terminate.

Figure 4:
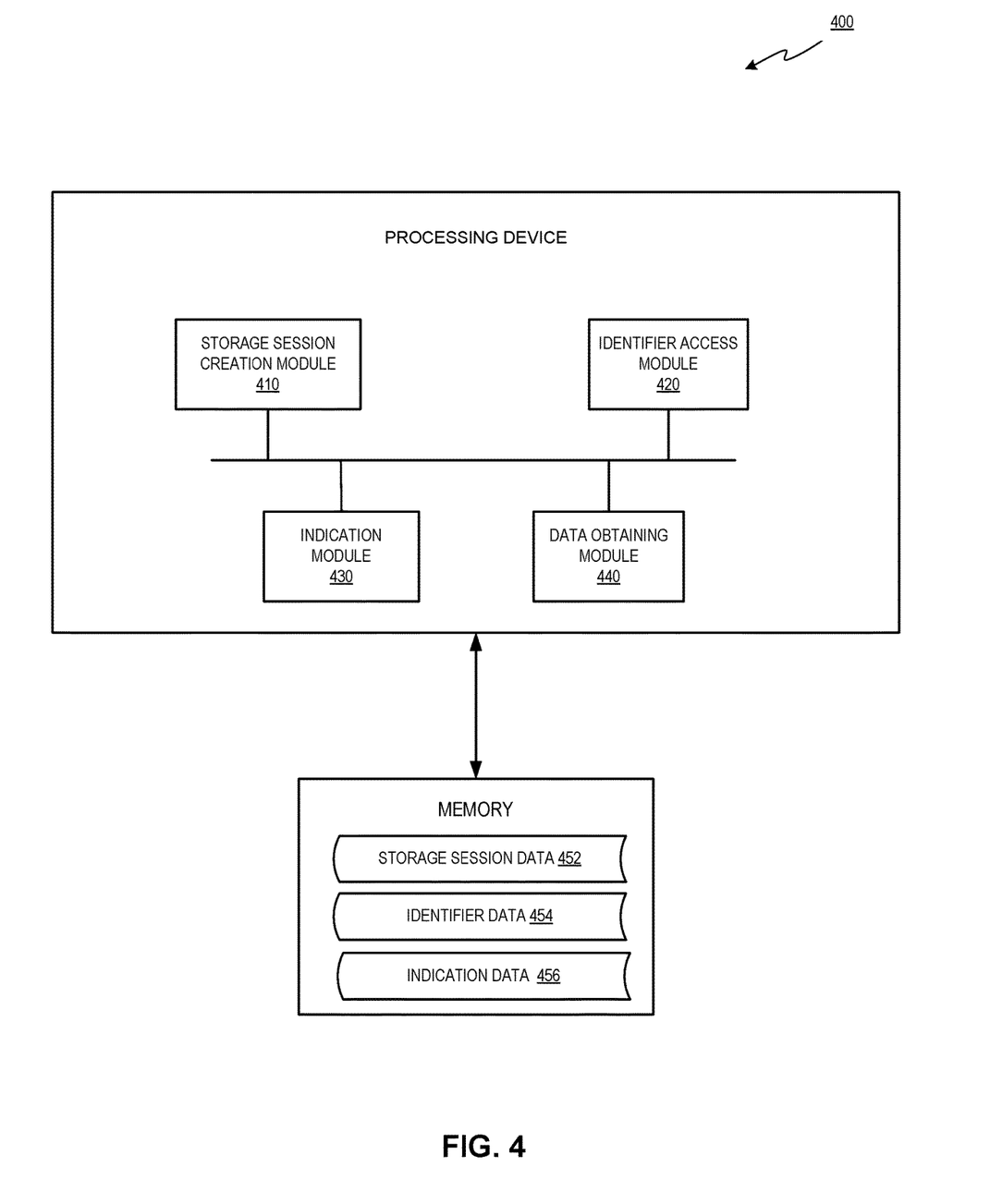
FIG. 4 depicts a block diagram of an example computer system in accordance with one or more aspects of the present disclosure.

FIG. 4 depicts a block diagram of a computer system 400 operating in accordance with one or more aspects of the present disclosure. Computer system 400 may be the same or similar to computer device 600 and may include one or more processing devices and one or more memory devices. In the example shown, computer system 400 may include a storage session creation module 410, an identifier access module 420, an indication module 430, and a data obtaining module 440.

Storage session creation module 410 may enable a processing device to initiate a creation of a storage session with a distributed storage service. The storage session may include storage session data 452 that corresponds to a storage object of the distributed storage service. The session data may include lock data, permission data, object identification data, other data, or a combination thereof and be associated with one or more storage objects of the distributed storage service. The distributed storage service may include a plurality of nodes that each include data of the storage object and the distributed storage service may provide block level access or file level access for the storage object.

Identifier access module 420 may enable the processing device to access an identifier of the storage session in persistent data storage after a restart of the client. The client may restart in response to an interruption that may cause an application, operating system, or client device, to fail. The identifier (e.g., identifier data 454) may be generated by the client of the distributed storage service or by a node of the distributed storage service. The processing device may store the identifier of the storage session in persistent data storage that is local to the client or remote from the client (e.g., accessible over a computing network). After the storage session is interrupted, the processing device may identify the storage session by detecting the identifier in the persistent data storage of the client.

Indication module 430 may enable the processing device to provide an indication that the client is recovering the storage session. Providing the indication may involve the client transmitting a signal or message to the distributed storage service to claim (e.g., acquire, recover, reclaim) the prior storage session. The message or signal (e.g., indication data 456) may include a request to reclaim the storage session and may elicit a response indicating the storage session exists (e.g., not been evicted). The message may include the identifier of the storage session (e.g., pre-existing storage session).

The indication may be provided in response to determining that access to the distributed storage service was interrupted. The indication may be provided before, during, or after initiating a grace period for recovering the storage session. In one example, the storage session may be associated with a first client before an interruption and may be associated with a second client after the interruption. In another example, the storage session may be associated with a first client before an interruption and may be associated with the first client after the interruption.

Data obtaining module 440 may enable the processing device to obtain the session data of the storage session from one or more devices that accessed the storage object of the distributed storage service. Obtaining session data of the storage session from the one or more devices may involve deriving (e.g., acquiring, gathering, rebuilding) the session data from reclaim requests received from the one or more devices. The client of the distributed storage service may export the storage object of the distributed storage service to the one or more devices. In one example, the one or more devices may include a plurality of Network File System (NFS) clients and the client may include an NFS server providing the one or more devices with access to the storage object of the distributed storage service.

Figure 5:
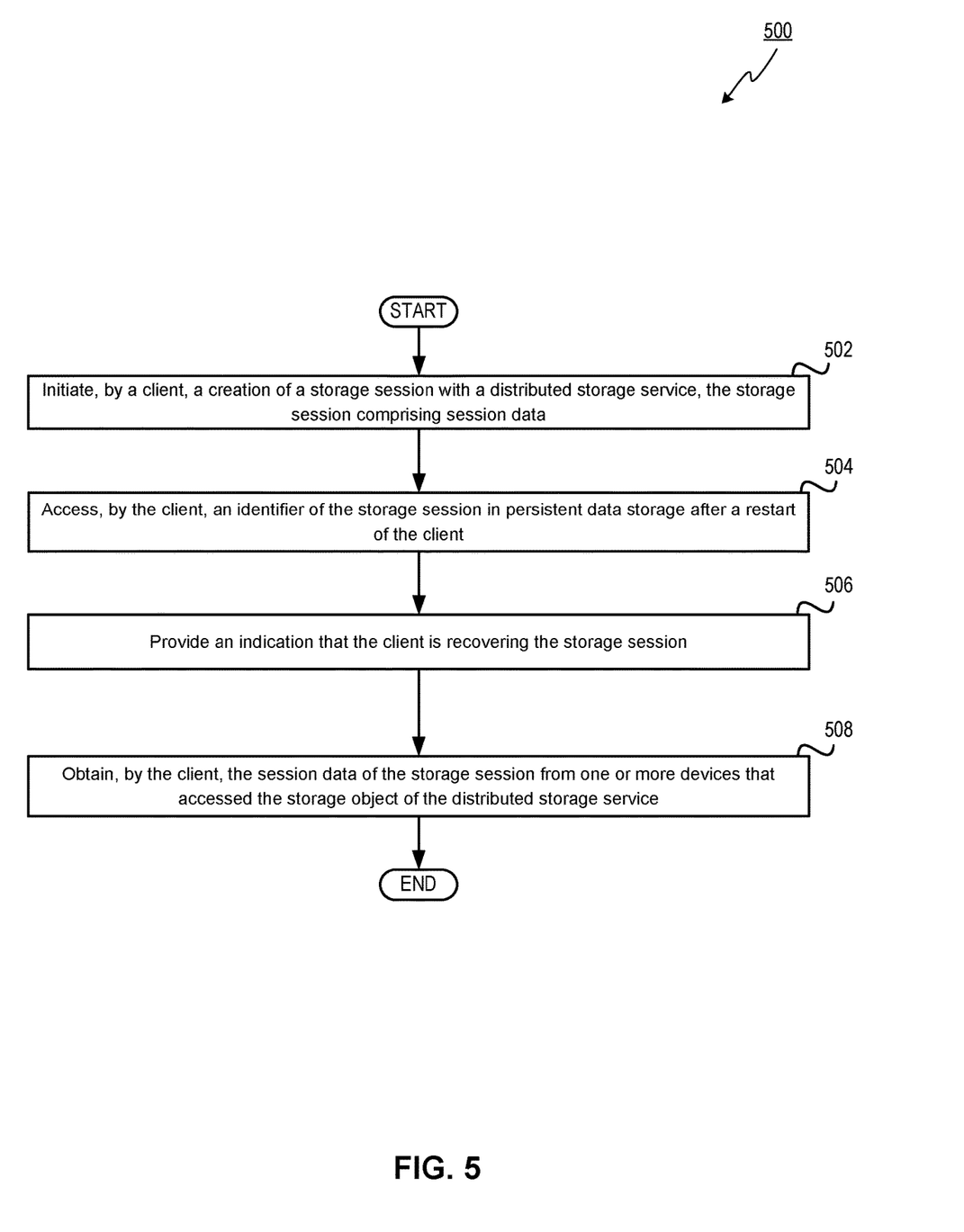
FIG. 5 depicts a flow diagram of another example method for recovering a storage session for a client of a distributed storage service, in accordance with one or more aspects of the present disclosure.

FIG. 5 depicts a flow diagram of one illustrative example of a method 500 for distributing a file system state that comprises a particular computer program, in accordance with one or more aspects of the present disclosure. Method 500 may be similar to method 300 and each of its individual functions, routines, subroutines, or operations may be performed by one or more processors of the computer device executing the method. Method 500 may be performed by processing devices of a computing device and may begin at block 502.

At block 502, a processing device of a client may initiate a creation of a storage session with a distributed storage service. The storage session may include session data that corresponds to a storage object of the distributed storage service. The session data may include lock data, permission data, object identification data, other data, or a combination thereof and be associated with one or more storage objects of the distributed storage service. The distributed storage service may include a plurality of nodes that each include data of the storage object and the distributed storage service may provide block level access or file level access for the storage object.

At block 504, the processing device may access an identifier of the storage session in persistent data storage after a restart of the client. The client may restart in response to an interruption that may cause an application, operating system, or client device, to fail. The identifier may be generated by the client of the distributed storage service or by a node of the distributed storage service. The processing device may store the identifier of the storage session in persistent data storage that is local to the client or remote from the client (e.g., accessible over a computing network). After the storage session is interrupted, the processing device may identify the storage session by detecting the identifier in the persistent data storage of the client.

At block 506, the processing device of a client may provide an indication that the client is recovering the storage session. Providing the indication may involve the client transmitting a signal or message to the distributed storage service to claim (e.g., acquire, recover, reclaim) the prior storage session. The message or signal may include a request to reclaim the storage session and may elicit a response indicating the storage session exists (e.g., not been evicted). The message may include the identifier of the storage session (e.g., pre-existing storage session).

The indication may be provided in response to determining that access to the distributed storage service was interrupted. The indication may be provided before, during, or after initiating a grace period for recovering the storage session. In one example, the storage session may be associated with a first client before an interruption and may be associated with a second client after the interruption. In another example, the storage session may be associated with a first client before an interruption and may be associated with the first client after the interruption.

At block 508, the processing device of the client may obtain the session data of the storage session from one or more devices that accessed the storage object of the distributed storage service. Obtaining session data of the storage session from the one or more devices may involve deriving (e.g., acquiring, gathering, rebuilding) the session data from reclaim requests received from the one or more devices. The client of the distributed storage service may export the storage object of the distributed storage service to the one or more devices. In one example, the one or more devices may include a plurality of Network File System (NFS) clients and the client may include an NFS server providing the one or more devices with access to the storage object of the distributed storage service. Responsive to completing the operations described herein above with references to block 508, the method may terminate.

Figure 6:
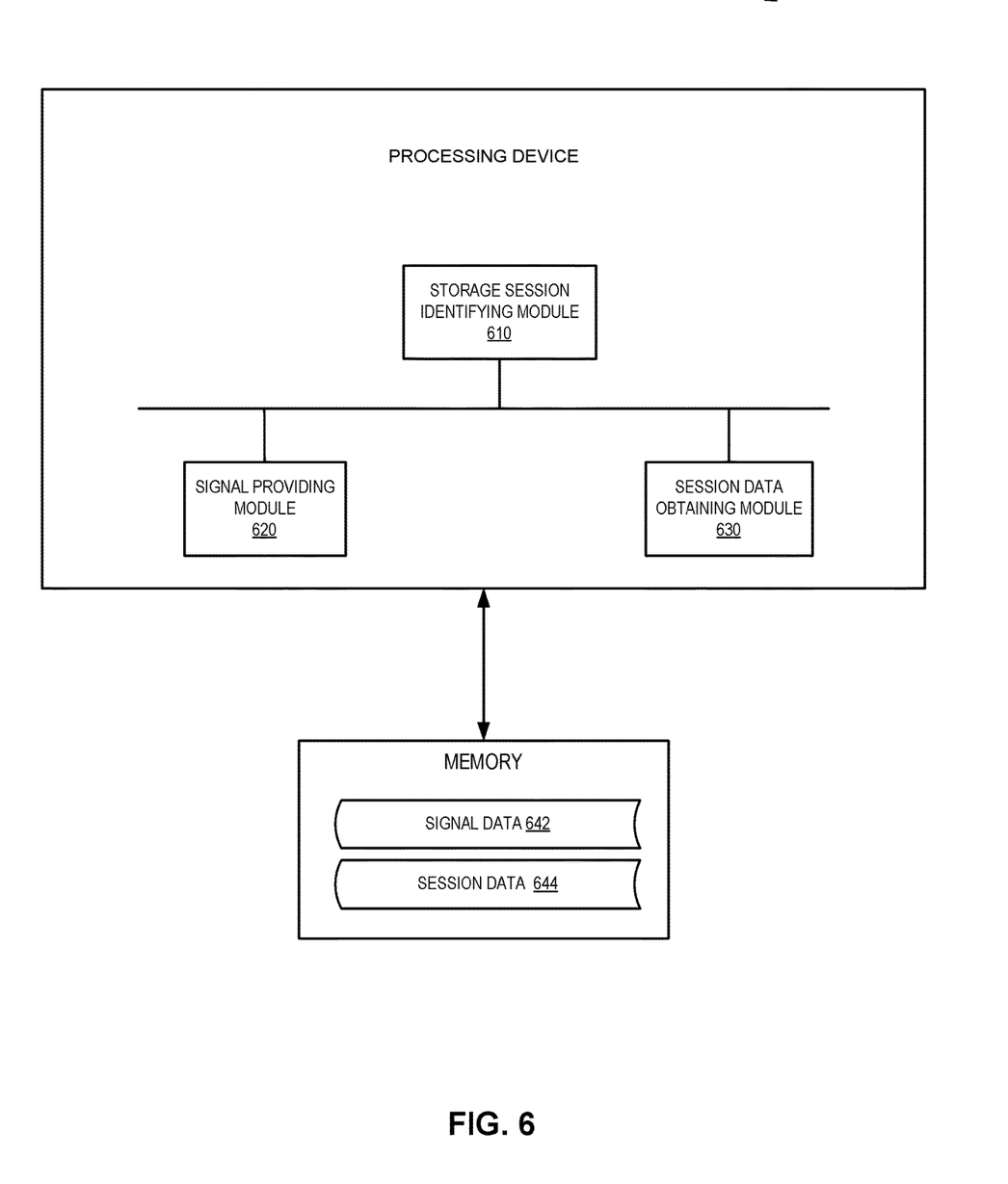
FIG. 6 depicts a block diagram of another example computer system in accordance with one or more aspects of the present disclosure.

FIG. 6 depicts a block diagram of a computer system 600 operating in accordance with one or more aspects of the present disclosure. Computer system 600 may include one or more processing devices and one or more memory devices. In the example shown, computer system 600 may include a storage session identifying module 610, a signal providing module 620, and a session data obtaining module 630.

Storage session identifying module 610 may enable a processing device to identify a storage session of a distributed storage service. The storage session may include session data that corresponds to a storage object of the distributed storage service. The session data may include lock data, permission data, object identification data, other data, or a combination thereof and be associated with one or more storage objects of the distributed storage service. The distributed storage service may include a plurality of nodes that each include data of the storage object and the distributed storage service may provide block level access or file level access to the storage object. In one example, the processing device may initiate a creation of the storage session with a storage provider of the distributed storage service and store an identifier of the storage session in persistent data storage. After the storage session is interrupted (e.g., client crashes), the processing device may identify the storage session by detecting the identifier in the persistent data storage of the client after the client is restarted.

Signal providing module 620 may enable the processing device to provide a signal that the client is recovering the storage session. Providing the signal may involve the client transmitting signal data 644 or a message to the distributed storage service to claim (e.g., acquire, recover, reclaim) the prior storage session. The message or signal may include a request to reclaim the storage session and may elicit a response indicating the storage session exists (e.g., not been evicted). The message may include an identifier of the storage session (e.g., pre-existing storage session) and the identifier may have been generated by the client of the distributed storage service or by a node of the distributed storage service. The signal may be provided in response to determining that access to the distributed storage service was interrupted and the signal may be provided before, during, or after initiating a grace period for recovering the storage session. In one example, the storage session may be associated with a first client before an interruption and may be associated with a second client after the interruption. In another example, the storage session may be associated with a first client before an interruption and may be associated with the first client after the interruption.

Session data obtaining module 630 may enable the processing device to obtain the session data 644 of the storage session from one or more devices that accessed the storage object of the distributed storage service. Obtaining session data 644 of the storage session from the one or more devices may involve deriving (e.g., acquiring, gathering, rebuilding) session data 644 from reclaim requests received from the one or more devices. The client of the distributed storage service may export the storage object of the distributed storage service to the one or more devices. In one example, the one or more devices may include a plurality of Network File System (NFS) clients and the client may include an NFS server providing the one or more devices with access to the storage object of the distributed storage service.

Figure 7:
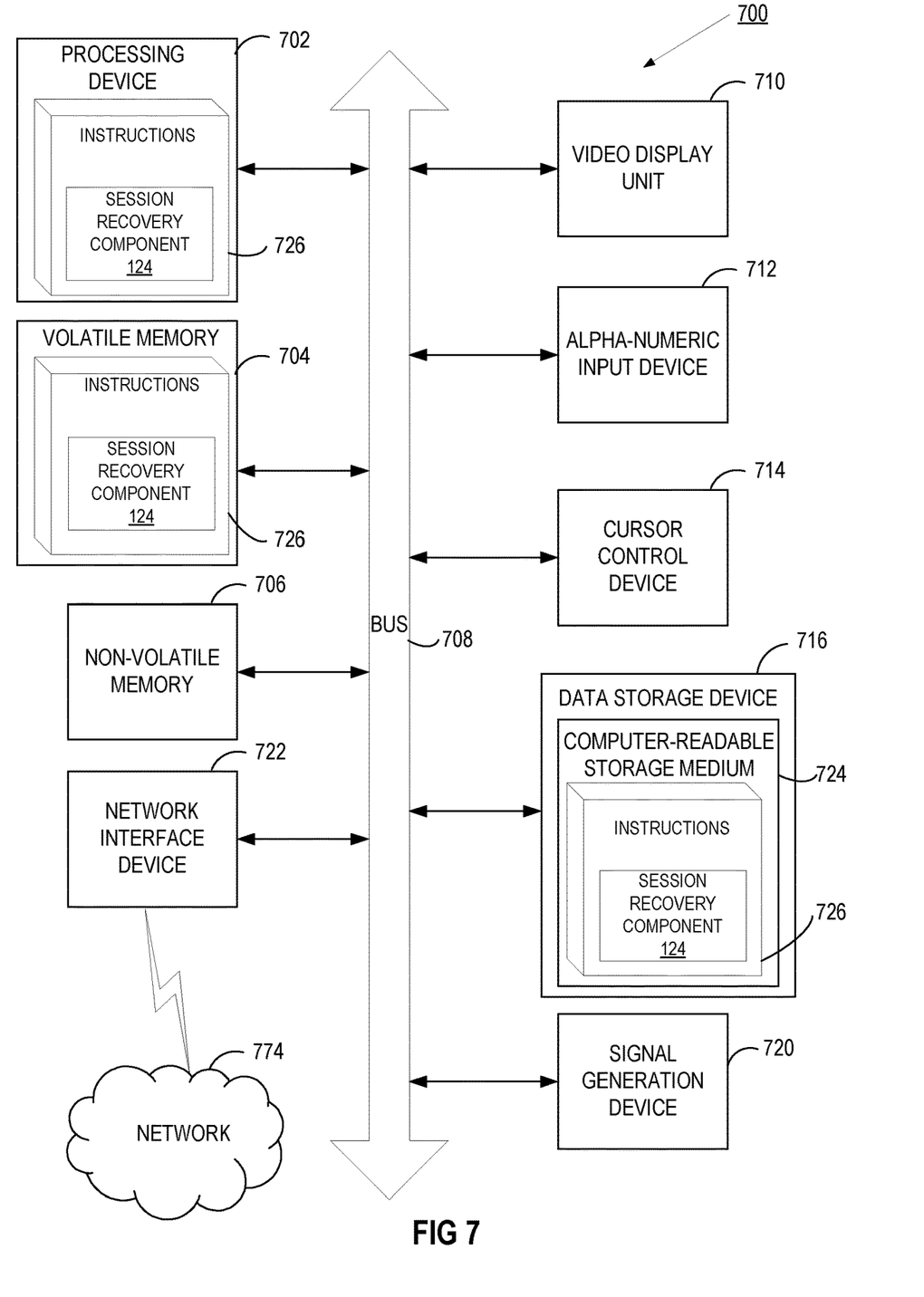
FIG. 7 depicts a block diagram of an illustrative computing device operating in accordance with the examples of the present disclosure.

FIG. 7 depicts a block diagram of a computer system operating in accordance with one or more aspects of the present disclosure. In various illustrative examples, computer system 700 may correspond to client 120, device 130A-Z, or nodes 112A-C of FIG. 1. Computer system 700 may be included within a data center that supports virtualization. Virtualization within a data center results in a physical system being virtualized using virtual machines to consolidate the data center infrastructure and increase operational efficiencies. A virtual machine (VM) may be a program-based emulation of computer hardware. For example, the VM may operate based on computer architecture and functions of computer hardware resources associated with hard disks or other such memory. The VM may emulate a physical computing environment, but requests for a hard disk or memory may be managed by a virtualization layer of a computing device to translate these requests to the underlying physical computing hardware resources. This type of virtualization results in multiple VMs sharing physical resources.

In certain implementations, computer system 700 may be connected (e.g., via a network, such as a Local Area Network (LAN), an intranet, an extranet, or the Internet) to other computer systems. Computer system 700 may operate in the capacity of a server or a client computer in a client-server environment, or as a peer computer in a peer-to-peer or distributed network environment. Computer system 700 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computer system 700 may include a processing device 702, a volatile memory 704 (e.g., random access memory (RAM)), a non-volatile memory 706 (e.g., read-only memory (ROM) or electrically-erasable programmable ROM (EEPROM)), and a data storage device 716, which may communicate with each other via a bus 708.

Processing device 702 may be provided by one or more processors such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

Computer system 700 may further include a network interface device 722. Computer system 700 also may include a video display unit 710 (e.g., an LCD), an alphanumeric input device 712 (e.g., a keyboard), a cursor control device 714 (e.g., a mouse), and a signal generation device 720.

Data storage device 716 may include a non-transitory computer-readable storage medium 724 on which may store instructions 726 encoding any one or more of the methods or functions described herein, including instructions for implementing methods 300 or 500 and for encoding session recovery component 124 of FIGS. 1 and 2.

Instructions 726 may also reside, completely or partially, within volatile memory 704 and/or within processing device 702 during execution thereof by computer system 700, hence, volatile memory 704 and processing device 702 may also constitute machine-readable storage media.

While computer-readable storage medium 724 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer and cause the computer to perform any one or more of the methods described herein. The term "computer-readable storage medium" shall include, but not be limited to, solid-state memories, optical media, and magnetic media.

Other computer system designs and configurations may also be suitable to implement the system and methods described herein. The following examples illustrate various implementations in accordance with one or more aspects of the present disclosure.

Example 1 is a method comprising: identifying a storage session of a distributed storage service, the storage session comprising session data that corresponds to a storage object of the distributed storage service; providing, by a processing device of a client, an indication that the client is recovering the storage session; and obtaining, by the client, the session data of the storage session from one or more devices that accessed the storage object of the distributed storage service.

Example 2 is a method of example 1, wherein the client exports the storage object of the distributed storage service to the one or more devices.

Example 3 is a method of example 1, wherein the one or more devices comprise a plurality of Network File System (NFS) clients and wherein the client of the distributed storage service comprises an NFS server providing the one or more devices with access to the storage object of the distributed storage service.

Example 4 is a method of example 1, wherein the session data comprises lock data, permission data, and object identification data for the storage object of the distributed storage service.

Example 5 is a method of example 1, further comprising: determining, by the client, that access to the distributed storage service was interrupted; and initiating, by the client, a grace period for recovering the storage session.

Example 6 is a method of example 1, wherein obtaining session data of the storage session from the one or more devices comprises deriving the session data from reclaim requests received from the one or more devices.

Example 7 is a method of example 1, wherein identifying the storage session comprises detecting, by the client, an identifier of the storage session in a persistent storage device after the client is restarted.

Example 8 is a method of example 1, wherein providing the indication comprises the client transmitting a message to the distributed storage service to claim the storage session, wherein the message comprises an identifier of the storage session.

Example 9 is a method of example 1, wherein the storage session is associated with a first client before an interruption and is associated with a second client after the interruption.

Example 10 is a system comprising: a memory; a processing device operatively coupled to the memory, the processing device to: initiate, by a client, a creation of a storage session with a distributed storage service, the storage session comprising session data that corresponds to a storage object of the distributed storage service; access, by the client, an identifier of the storage session in persistent data storage after a restart of the client; provide an indication that the client is recovering the storage session; and obtain, by the client, the session data of the storage session from one or more devices that accessed the storage object of the distributed storage service.

Example 11 is a system of example 10, wherein the identifier of the storage session is generated by the client of the distributed storage service or by the distributed storage service.

Example 12 is a system of example 10, wherein the client exports the storage object of the distributed storage service to the one or more devices.

Example 13 is a system of example 10, wherein the one or more devices comprise a plurality of Network File System (NFS) clients and wherein the client of the distributed storage service comprises an NFS server providing the one or more devices with access to the storage object of the distributed storage service.

Example 14 is a system of example 10, wherein the session data comprises lock data, permission data, and object identification data for the storage object of the distributed storage service.

Example 15 is a non-transitory machine-readable storage medium storing instructions that cause a processing device to: identify a storage session of a distributed storage service, the storage session comprising session data that corresponds to a storage object of the distributed storage service; provide, by the processing device of a client, an indication that the client is recovering the storage session; and obtain, by the client, the session data of the storage session from one or more devices that accessed the storage object of the distributed storage service.

Example 16 is a non-transitory machine-readable storage medium of example 15, wherein the distributed storage service comprises a plurality of nodes that each comprise data of the storage object.

Example 17 is a non-transitory machine-readable storage medium of example 15, wherein the client exports the storage object of the distributed storage service to the one or more devices.

Example 18 is a non-transitory machine-readable storage medium of example 15, wherein the one or more devices comprise a plurality of Network File System (NFS) clients and wherein the client of the distributed storage service comprises an NFS server providing the one or more devices with access to the storage object of the distributed storage service.

Example 19 is a non-transitory machine-readable storage medium of example 15, wherein the session data comprises lock data, permission data, and object identification data for the storage object of the distributed storage service.

Example 20 is a non-transitory machine-readable storage medium of example 15, wherein the processing device is further to: determine, by the client, that access to the distributed storage service was interrupted; and initiate, by the client, a grace period for recovering the storage session.

Example 21 is a system comprising: a memory; a processing device operatively coupled to the memory, the processing device to: identify a storage session of a distributed storage service, the storage session comprising session data that corresponds to a storage object of the distributed storage service; provide, by a client, a signal that the client is recovering the storage session; and obtain, by the client, the session data of the storage session from one or more devices that accessed the storage object of the distributed storage service.

Example 22 is a system of example 21, wherein the client exports the storage object of the distributed storage service to the one or more devices.

Example 23 is a system of example 21, wherein the one or more devices comprise a plurality of Network File System (NFS) clients and wherein the client of the distributed storage service comprises an NFS server providing the one or more devices with access to the storage object of the distributed storage service.

Example 24 is a system of example 21, wherein the session data comprises lock data, permission data, and object identification data for the storage object of the distributed storage service.

Example 25 is a system of example 21, wherein the processing device is further to: determine, by the client, that access to the distributed storage service was interrupted; and initiate, by the client, a grace period for recovering the storage session.

Example 26 is a system of example 21, wherein to obtain session data the processing device is to derive the session data from reclaim requests received from the one or more devices.

Example 27 is a system of example 21, wherein to identify the storage session the processing device is to detect, by the client, an identifier of the storage session in a persistent storage device after the client is restarted.

Example 28 is a system of example 21, wherein to provide the signal the processing device is to transmit a message to the distributed storage service to claim the storage session, wherein the message comprises an identifier of the storage session.

Example 29 is a system of example 21, wherein the storage session is associated with a first client before an interruption and is associated with a second client after the interruption.

Example 30 is an apparatus comprising: a means to identify a storage session of a distributed storage service, the storage session comprising session data that corresponds to a storage object of the distributed storage service; a means to provide, by a client, an indication that the client is recovering the storage session; and a means to obtain, by the client, the session data of the storage session from one or more devices that accessed the storage object of the distributed storage service.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and computer program components, or in computer programs.

Unless specifically stated otherwise, terms such as "identifying," "providing," "obtaining," "determining," "initiating," "accessing," "detecting," "generating," "creating," "establishing," "transmitting," or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. Also, the terms "first," "second," "third," "fourth," etc. as used herein are meant as labels to distinguish among different elements and may not have an ordinal meaning according to their numerical designation.

Examples described herein also relate to an apparatus for performing the methods described herein. This apparatus may be specially constructed for performing the methods described herein, or it may comprise a general purpose computer system selectively programmed by a computer program stored in the computer system. Such a computer program may be stored in a computer-readable tangible storage medium.

The methods and illustrative examples described herein are not inherently related to any particular computer or other apparatus. Various general purpose systems may be used in accordance with the teachings described herein, or it may prove convenient to construct more specialized apparatus to perform methods 300, 500 and/or each of its individual functions, routines, subroutines, or operations. Examples of the structure for a variety of these systems are set forth in the description above.

The above description is intended to be illustrative, and not restrictive. Although the present disclosure has been described with references to specific illustrative examples and implementations, it will be recognized that the present disclosure is not limited to the examples and implementations described. The scope of the disclosure should be determined with reference to the following claims, along with the full scope of equivalents to which the claims are entitled.

What is claimed is:

1. A method comprising:
   identifying a storage session of a distributed storage service, the storage session comprising session data that corresponds to a storage object of the distributed storage service, wherein the session data is stored on a storage provider device of the distributed storage service;
   providing, by a storage exporter device, an indication that the storage exporter device is recovering the storage session, wherein the storage session enables the storage exporter device to export the storage object of the distributed storage service to one or more storage consumer devices;
   receiving, by the storage exporter device, a plurality of reclaim requests from the one or more storage consumer devices; and
   deriving, by the storage exporter device, session data for the storage session from the plurality of reclaim requests received from the one or more storage consumer devices.

2. The method of claim 1, wherein the storage exporter device that exports the storage object after an interruption is the storage exporter device that exports the storage object before the interruption.

3. The method of claim 1, wherein each of the one or more storage consumer devices comprises a Network File System (NFS) client and wherein the storage exporter device comprises an NFS server providing the one or more storage consumer devices with access to the storage object of the distributed storage service.

4. The method of claim 1, wherein the derived session data comprises lock data, permission data, and object identification data for the storage object of the distributed storage service.

5. The method of claim 1, further comprising:
   determining, by the storage exporter device, that access to the distributed storage service was interrupted; and
   initiating, by the storage exporter device, a grace period for recovering the storage session.

6. The method of claim 1, wherein deriving the session data of the storage session from the one or more storage consumer devices comprises generating session data in view of lock data and handle data of the plurality of reclaim requests received from the one or more storage consumer devices.

7. The method of claim 1, wherein identifying the storage session comprises detecting, by the storage exporter device, an identifier of the storage session in a persistent storage device of the storage exporter device after a restart.

8. The method of claim 1, wherein providing the indication comprises the storage exporter device transmitting a message over a network to a node of the distributed storage service to claim the storage session, wherein the message comprises an identifier of the storage session.

9. The method of claim 1, wherein the storage session is associated with a first storage exporter device before an interruption and is associated with a second storage exporter device after the interruption.

10. A system comprising:
    a memory;
    a processing device operatively coupled to the memory, the processing device to:
    initiate, by a storage exporter device, a creation of a storage session with a distributed storage service, the storage session comprising session data that corresponds to a storage object of the distributed storage service, wherein the session data is stored on a storage provider device of the distributed storage service;
    access, by the storage exporter device, an identifier of the storage session in persistent data storage after a restart of the storage exporter device;
    provide an indication that the storage exporter device is recovering the storage session;
    receive, by the storage exporter device, a plurality of reclaim requests from one or more storage consumer devices; and
    derive, by the storage exporter device, session data for the storage session from the plurality of reclaim requests received from the one or more storage consumer devices.

11. The system of claim 10, wherein the identifier of the storage session is generated by the storage exporter device or by the distributed storage service.

12. The system of claim 10, wherein the storage exporter device that exports the storage object after an interruption is the storage exporter device that exports the storage object before the interruption.

13. The system of claim 10, wherein each of the one or more storage consumer devices comprises a Network File System (NFS) client and wherein the storage exporter device comprises an NFS server that provides the one or more storage consumer devices with access to the storage object of the distributed storage service.

14. The system of claim 10, wherein the session data comprises lock data, permission data, and object identification data for the storage object of the distributed storage service.

15. A non-transitory machine-readable storage medium storing instructions that cause a processing device of a storage exporter device to:
   identify a storage session of a distributed storage service, the storage session comprising session data that corresponds to a storage object of the distributed storage service, wherein the session data is stored on a storage provider device of the distributed storage service;
   provide, by the storage exporter device, an indication that the storage exporter device is recovering the storage session, wherein the storage session enables the storage exporter device to export the storage object of the distributed storage service to one or more storage consumer devices;
   receive, by the storage exporter device, a plurality of reclaim requests from the one or more storage consumer devices; and
   derive, by the storage exporter device, session data for the storage session from the plurality of reclaim requests received from the one or more storage consumer devices.

16. The non-transitory machine-readable storage medium of claim 15, wherein the distributed storage service comprises a plurality of nodes that each comprise data of the storage object.

17. The non-transitory machine-readable storage medium of claim 15, wherein the storage object of the distributed storage service comprises a file object of a distributed file system.

18. The non-transitory machine-readable storage medium of claim 15, wherein each of the one or more storage consumer devices comprises a Network File System (NFS) client and wherein the storage exporter device comprises an NFS server that provides the one or more storage consumer devices with access to the storage object of the distributed storage service.

19. The non-transitory machine-readable storage medium of claim 15, wherein the session data comprises lock data, permission data, and object identification data for the storage object of the distributed storage service.

20. The non-transitory machine-readable storage medium of claim 15, wherein the processing device is further to:
   determine, by the storage exporter device, that access to the distributed storage service was interrupted; and
   initiate, by the storage exporter device, a grace period for recovering the storage session.

* * * * *